United States Patent
Barnett

(10) Patent No.: US 10,638,742 B1
(45) Date of Patent: May 5, 2020

(54) WATER-ACTIVATED BOBBER RELEASE DEVICE WITH VALVE

(71) Applicant: Cory P. Barnett, Dripping Springs, TX (US)

(72) Inventor: Cory P. Barnett, Dripping Springs, TX (US)

(*) Notice: Subject to any disclaimer, the term of this patent is extended or adjusted under 35 U.S.C. 154(b) by 296 days.

(21) Appl. No.: 15/784,216

(22) Filed: Oct. 16, 2017

Related U.S. Application Data

(60) Provisional application No. 62/415,540, filed on Nov. 1, 2016.

(51) Int. Cl.
*A01K 93/02* (2006.01)
*A01K 97/12* (2006.01)
*A01K 99/00* (2006.01)
*A01K 87/00* (2006.01)

(52) U.S. Cl.
CPC .......... *A01K 97/125* (2013.01); *A01K 99/00* (2013.01); *A01K 87/00* (2013.01)

(58) Field of Classification Search
CPC ...... A01K 97/00; A01K 97/12; A01K 97/125; A01K 93/00; A01K 99/00; B63C 7/00; B63C 7/26
USPC .................. 43/17, 17.2, 25; 441/11, 6–8, 26
See application file for complete search history.

(56) References Cited

U.S. PATENT DOCUMENTS

| | | | |
|---|---|---|---|
| 2,418,549 A * | 4/1947 | De Rugeris | B63B 22/10 441/8 |
| 2,479,021 A * | 8/1949 | Perkins | B63B 22/10 441/8 |
| 2,528,799 A * | 11/1950 | Strong | A01K 97/24 441/8 |
| 2,531,586 A | 11/1950 | Ramsey | |
| 2,791,785 A | 5/1957 | Metts | |
| 2,818,586 A * | 1/1958 | Dayer | F42B 19/36 441/10 |
| 3,366,983 A | 2/1968 | Adams | |
| 3,630,413 A | 12/1971 | Beckes et al. | |
| 3,716,882 A | 2/1973 | Middleton | |
| 3,802,012 A | 4/1974 | Middleton, Jr. | |
| 3,982,294 A * | 9/1976 | Hicken | A01K 87/00 441/8 |

(Continued)

FOREIGN PATENT DOCUMENTS

WO    1992008641 A1    5/1992

*Primary Examiner* — Peter M Poon
*Assistant Examiner* — Danielle A Clerkley
(74) *Attorney, Agent, or Firm* — Creativenture Law, LLC; Dennis JM Donahue III; Kevin Staed

(57) ABSTRACT

A water-activated bobber release device has a housing, a bobber assembly, a spool and a line, a bobbin assembly with a dissolvable tablet, a screw extending through a central hole in the bobber assembly and a center hole in the dissolvable tablet of the bobbin assembly, and a cap with an aperture and a valve between the aperture and the bobbin assembly. The screw engages the bobbin assembly and a threaded fastener to compress a spring. When the device is submerged in a body of water at a certain depth, the pressure opens the valve to allow water to enter. The water dissolves the tablet which collapses the bobbin assembly, and the spring forces the bobber away from the housing. Once released from the housing, the bobber is free to float to the surface of the water allowing for the retrieval of the submerged item attached to the housing.

20 Claims, 12 Drawing Sheets

(56) References Cited

U.S. PATENT DOCUMENTS

| | | | |
|---|---|---|---|
| 4,040,135 A * | 8/1977 | Arnold | B63C 7/26 |
| | | | 441/10 |
| 4,126,907 A | 11/1978 | Fish | |
| 4,260,075 A | 4/1981 | Mackal | |
| 4,433,638 A * | 2/1984 | Ashline | G08B 5/002 |
| | | | 116/210 |
| 4,583,314 A | 4/1986 | Kirkland | |
| 4,619,066 A | 10/1986 | Kirkland | |
| 4,713,031 A | 12/1987 | Fuller | |
| 5,857,881 A | 1/1999 | Zippel, Sr. | |
| 5,921,835 A | 7/1999 | Gordon et al. | |
| 6,036,559 A | 3/2000 | Arnold et al. | |
| 6,705,488 B2 | 3/2004 | Mackal | |
| 7,572,161 B2 | 8/2009 | Mackal | |
| 7,819,714 B2 | 10/2010 | Medford et al. | |
| 8,105,124 B2 | 1/2012 | Williams | |
| 8,720,363 B2 | 5/2014 | Weatherford | |
| 8,899,170 B2 | 12/2014 | Bell | |
| 9,277,739 B1 | 3/2016 | Barnett | |
| 2007/0135001 A1 * | 6/2007 | Mickelson | A01K 93/00 |
| | | | 441/6 |
| 2011/0078938 A1 | 4/2011 | Aguzin | |
| 2013/0047912 A1 * | 2/2013 | Bell | B63C 7/26 |
| | | | 116/209 |
| 2015/0230445 A1 * | 8/2015 | Fotland | A01K 91/02 |
| | | | 124/60 |

\* cited by examiner

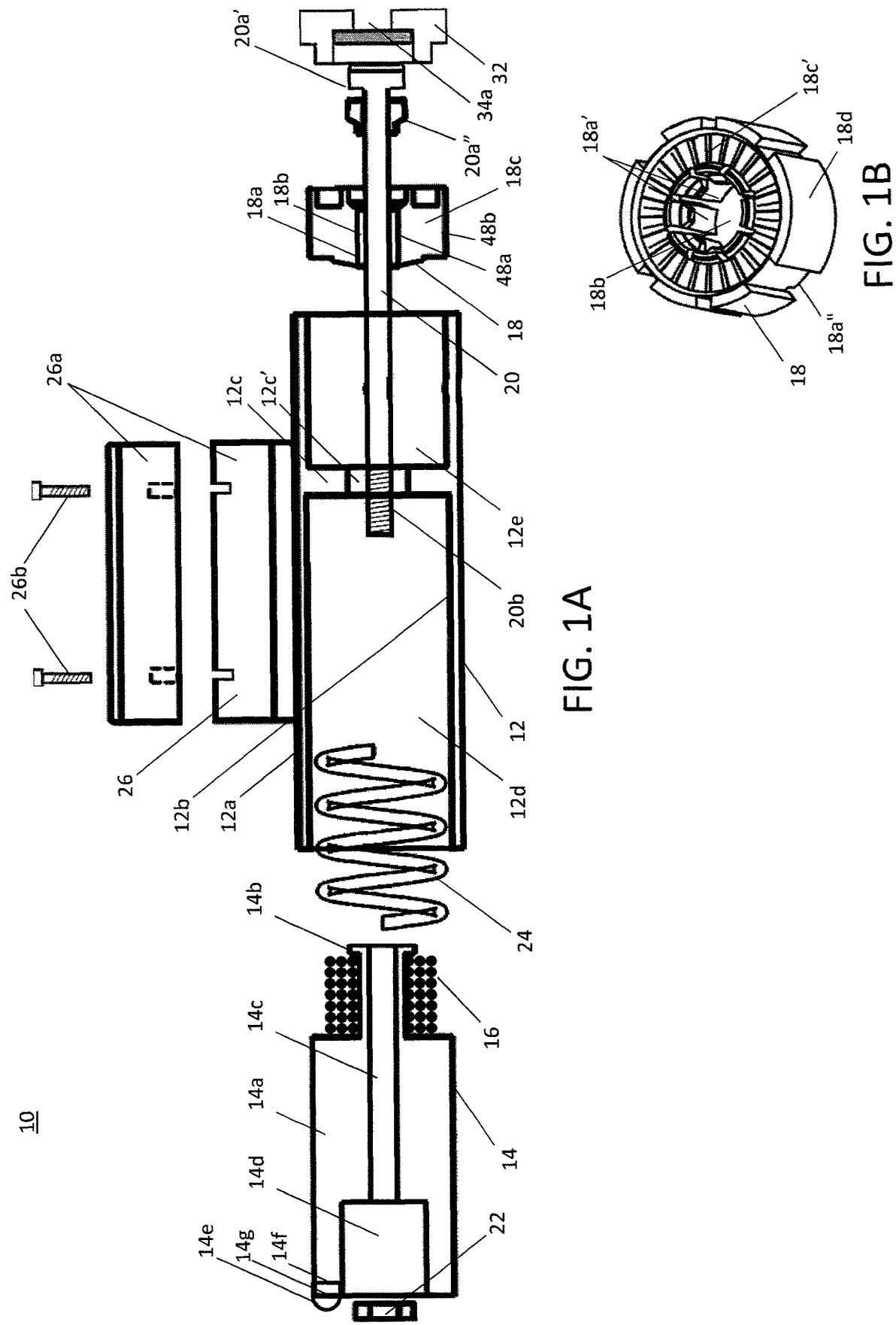

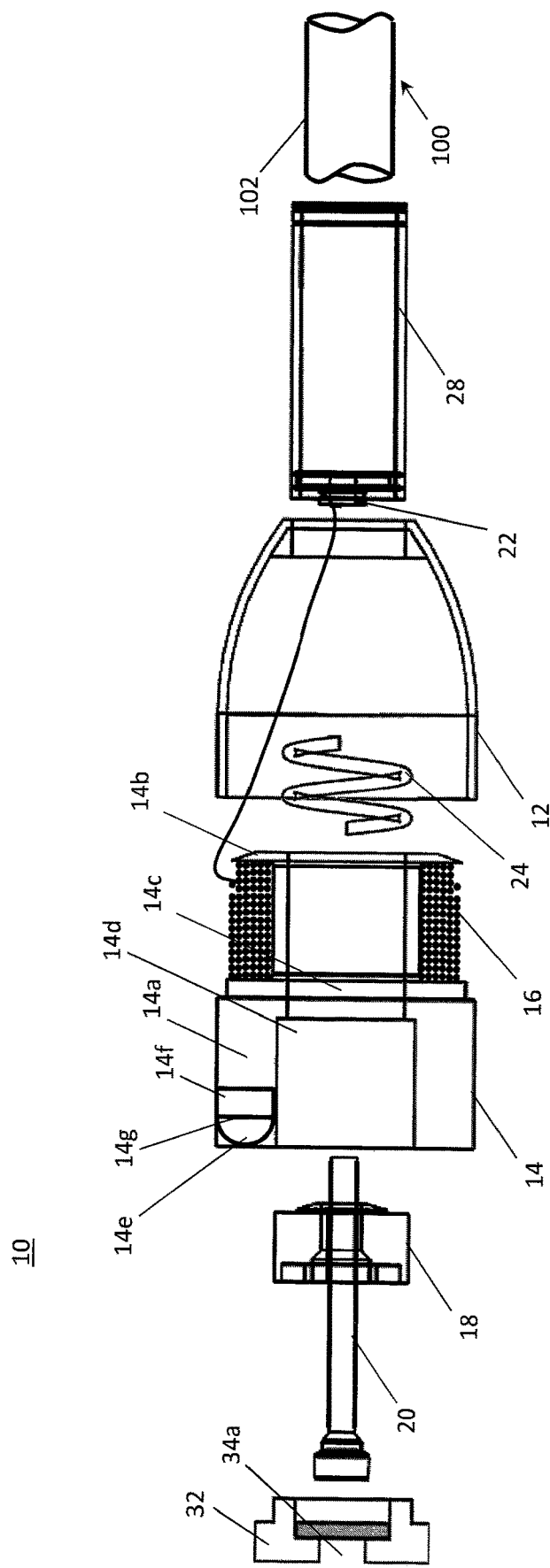

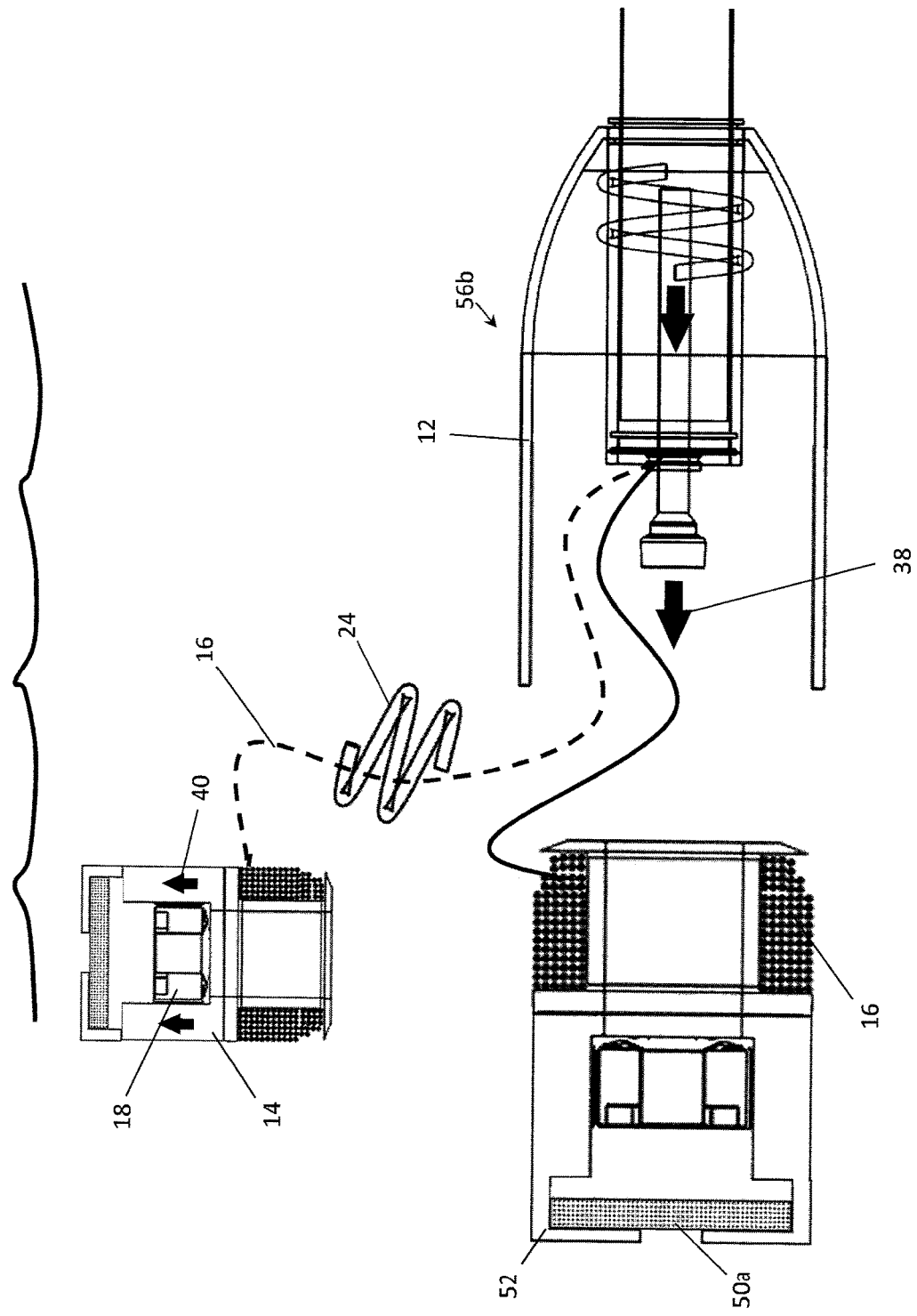

WATER-ACTIVATED BOBBER RELEASE DEVICE WITH VALVE

CROSS-REFERENCE TO RELATED APPLICATIONS

This application claims priority from U.S. Provisional Patent Application No. 62/415,540 filed on Nov. 1, 2016 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to a device, system, and method of locating and retrieving a submerged item, and more particularly to reusable water-activated bobber release device for releasing the bobber when the device is exposed to water. The reusable device advantageously minimizes the number of moving parts to allow for quick, easy resetting of the device.

Related Art

Existing water-activated bobber release devices are used for releasing a bobber when items, such as fishing rods, rifles or other items become submerged. Traditionally, these devices hold a bobber in place by, in essence, applying a shearing force to a small section of a dissolvable tablet, such that the tablet is under a constant, compressing shear force that seeks to rip the tablet apart at the point of contact. The devices hold the bobber in place by directly opposing the force of the spring by placing the tablet in the way of the bobber's release. This method of operation, however, is prone to inadvertent bobber release, as the tablet breaks down to the constant force and moisture in the ambient atmosphere without the device having been submerged in water. In other words, these devices tend to deploy when the fisherman least wants it to do so, i.e., when the fisherman is reeling in an aggressive fish, while the rod is being transported in a vehicle or when the rod is in storage. The devices that rely on this bobber retention method fail to protect against inadvertent release in the manner used by the present invention, as the present invention instead redirects and redistributes the axial force in a radially outward direction. Additionally, in the prior art devices, the point of contact between the tablet and the opposing structure are necessarily formed of dissimilar materials, with the tablet being formed of salt and the opposing structure being formed from plastic, metal or some other non-dissolving material. Whenever there is a concentrated stress or tension between dissimilar metals, there is the likelihood of increased corrosion and strain which could cause the salt tablet to weaken prematurely. Accordingly, it would be advantageous to avoid concentrations of tension between dissimilar materials.

Other devices that use alternate retention methods, such as salt bobbins, suffer from other serious flaws. These devices utilize a multitude of moving parts positioned deep within their devices, which introduce at least two fatal flaws to those devices. One, moving parts such as internal, rotating metal line reels are subject to rusting when exposed to water. Should enough rust accumulate, the reel stops rotating and does not release any bobber line when submerged. In other words, actual exposure to water prevents the other "water-activated" devices from actually working. Conversely, some of the water-activated devices can be prematurely activated by exposure to water when the device has not been submerged underwater.

The other fatal flaw is that these deeply-positioned parts, like the internal reel, prevent the fisherman from resetting the device for continued use, short of completely disassembling the device housing. These devices are neither designed nor intended to be resettable and reusable, but are instead intended to be used but a single time. In other words, these devices are different from present invention and teach away from the various aspects of the present invention described below.

Other "non-bobber" devices exist that utilize a salt bobbin to activate some feature(s). For example, some automatically-inflating rafts and jackets use a salt bobbin in their respective automatic inflators to activate when exposed to water. In these examples, a plunger with a piercing needle is held in place by a salt bobbin. When the bobbin is exposed to water, the bobbin expands and releases the plunger, which in turn punctures a compressed gas container to inflate the device. As will be apparent below, these devices are distinctly different in form and function from the present invention.

The applicant's prior invention, U.S. Pat. No. 9,277,739, solves the need for a reusable water-activated bobber release device which uses a bobbin, minimizes the moving parts and allows a user to quickly reset the device to its ready configuration without any need to disassemble the device housing. It would be beneficial to improve the prior invention by preventing premature activation of the release device. In particular, it would be an improvement to block water from reaching the release device when the water merely splashes onto the outer surface, preventing exposure from water until the device is submerged to a depth at which water pressure triggers the exposure which then results in the release device.

It is known in the art that a valve system can be used to prevent water from reaching the dissolvable tablet. For example, the WO 1992008641 invention uses a valve system that opens up holes within a middle chamber to allow water to reach a water soluble body. However, the housing comprises a single piece construction with a middle chamber that extends through a hole in a secured cover. Since the release mechanism is held within the middle chamber and the cover is secured to the housing, it is not possible for an object, specifically a bobber assembly, to be ejected through the hole in the cover. Further, since the cover is secured to the housing, the cover cannot be released, which would also inhibit the ejection of a bobber assembly. It is still necessary for an invention to create a valve mechanism to allow the release of a bobber assembly for retrieving a submerged device.

SUMMARY OF THE INVENTION

The inventive water-activated bobber release device uses a bobbin assembly to release a bobber assembly from a housing that is attached to a fishing rod when the fishing rod is submerged in water. The bobber assembly includes a bobber, a spool and a central hole, and the bobbin assembly has a framework surrounding a center hole and a dissolvable tablet within the framework. The device also has a spring, a screw, and a fastener. The screw's flared head engages the framework and its elongated threaded section extends through the central hole and the center hole where the fastener connects to the screw to hold the spring in compression when the tablet is solidified. The device also has a line wrapped around the spool connecting the bobber assembly to the housing or the item. The device also has a valve that prevents water from entering the housing unless the device is submerged and water pressure forces water through the valve into the housing. When the device is submerged in water, the valve allows water into the housing which dissolves the tablet, and the spring forces the screw's head through the bobbin assembly, thereby jettisoning the bobber assembly from the housing where it is free to float to the surface for retrieval.

Above the water, the disc valve system provides a seal, keeping the dissolvable tablet dry. The valve is opened or otherwise allows water to flow into the housing based on the water pressure at a particular depth. Accordingly, when the device enters water and reaches the activation depth, the water pressure activates the valve to permit water into the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale. In addition, in the embodiments depicted herein, like reference numerals in the various drawings refer to identical or near identical structural elements.

FIG. 1A is an exploded view of one embodiment of a water-activated bobber release device according to the present invention;

FIG. 1B is a detail perspective view of a reusable bobbin assembly used in the bobber release device of FIG. 1A.

FIG. 3 is an exploded view of another embodiment of a water-activated bobber release device according to the present invention;

FIGS. 9A and 9B respectively show a bobber release device similar to the device having the porous valve system in a ready configuration and in a deployed configuration.

DETAILED DESCRIPTION OF THE PREFERRED EMBODIMENTS

Figure 2A:
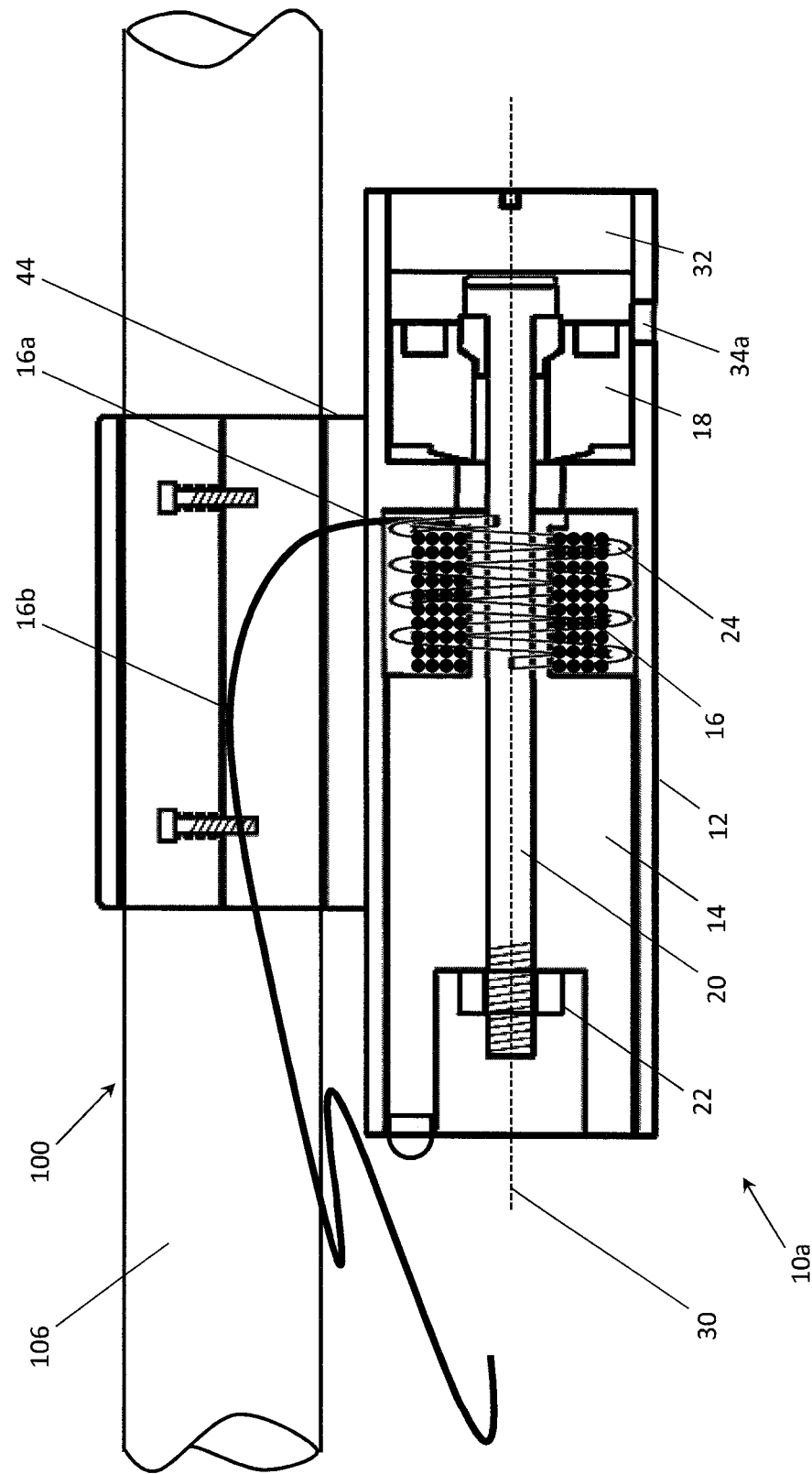
FIGS. 2A and 2B respectively show a bobber release device similar to the device shown in FIG. 1A in a ready configuration and in a deployed configuration.

The following description of the preferred embodiment(s) is merely exemplary in nature and is in no way intended to limit the invention, its application, or uses.

The present invention is a water-activated bobber release device 10 that is attached to a fishing rod 100 or other tool and allows the retrieval of the item when it is submerged in a body of water 110. As shown in the illustrations listed above, the device has a housing 12, a spring 24, a bobber assembly 14 having a bobber 14a, a spool 14b and a central hole 14c, a bobbin assembly 18 having a framework 18a surrounding a center hole 18b and a dissolvable tablet 18c within the framework, a screw 20 having a flared head 20a engaging the framework and an elongated threaded rod section 20b extending through the central hole and the center hole, and a threaded fastener 22 connected to the screw hole holding the spring in compression when the tablet is solidified 18c'. The device also has a line 16 wrapped around the spool connecting the bobber assembly to the housing or directly to the tool. The device preferably includes a cap, plug or other closure 32 that covers the end of the device which contains the bobbin assembly with the dissolvable tablet. The cap 52 has one or more apertures 52b that extend through the cap 52, between the exterior side and the interior side, and a valve 50 is situated in the interior space of the cap between the aperture(s) and the bobbin assembly 18. The cap 52 can be made from any material, including without limitation hard plastic, foam, or wood.

Different types of valve structures 50 are described below with reference to FIGS. 6A-8B. As particularly described below, the valve can be a porous non-mechanical valve 50a, a spring-loaded valve 50b, or a stop valve 50c. In each one of the embodiments, the valve 50 includes a disc 50' that abuts against the interior side 52a of the cap 52 and covers the aperture(s). The cap 52 preferably includes interior walls 52c extending from the interior side 52a of the cap 52 spaced a distance around a center aperture 52b in the cap 52 to form the interior space and to provide a seat for the valve 50. The interior walls 52c can extend from the outer circumference of the cap or at a location spaced inwardly from the outer circumference. In general, the valve 50 has a closed configuration 56a that seals the end of the bobber release device 10 with the bobbin assembly 18 and the dissolvable tablet 18c. When the housing 12 is submerged in water, water pressure 54b is exerted on the valve 50 through the aperture 52b in the cap 52 and forces the valve 50 to its opened position 56b and water enters into the bobber release device to dissolve the tablet 18c''. When the tablet dissolves 18c, the spring supplies a force 38 to push the screw's head through the bobbin assembly, thereby jettisoning the bobber assembly 14 or suitable buoyant device from the housing 12 where it is free to float 40 to the surface of the water body 110 for retrieval.

As can be seen in FIGS. 9A-10B, the valve assembly 50 is mounted within the housing 12 until it is flush with the housing's walls. Accordingly, the valve assembly is integrated within the housing and remains within the bobber housing when it is deployed. It should be appreciated that the valve assembly can be secured within the housing by any number of ways including but not limited to a mechanical fastener, an adhesive and a friction fit. Accordingly the valves can similarly be reused with the entire bobber assembly as described herein.

When a fisherman inadvertently drops the fishing rod 100 into water of a particular depth. The inventive bobber release device 10 advantageously allows a person to retrieve the fishing rod when it is submerged to a sufficient depth. The bobber 14a is jettisoned from the housing 12 and can be retrieved by pulling in the recovery line 16 connecting the deployed bobber of the submerged item. As explained in detail below, the bobber release device is reusable, allowing the person to quickly reset the device with a replaceable bobbin assembly 18 and reuse the device.

An exemplary bobber release device 10 is shown in FIGS. 1 and 2. In this embodiment, the device has a housing 12 which is operatively attached to the grip 106 of a fishing rod 100 which can be proximate to the reel assembly/mechanism 108. The bobber release device is attached to the rod by a mounting mechanism, such as a mounting bracket 26 which may be connected by a clamshell or chassis 26a that may be clamped around the rod or secured with screws 26b. It will also be appreciated that the mounting bracket may be attached using straps, zip-ties or other fasteners. The bobber release device is generally attached to the rod at locations that minimally impact the use of the fishing rod for its intended purpose, such as the side of the rod opposite the reel or at the butt end 102 of the rod 100. However, the bobber release device can be attached to the rod at any location that the user finds convenient.

The central hole extends through the bobber assembly and surrounds the longitudinal axis 30 of the bobber assembly. The center hole of the bobbin assembly is axially aligned with the central hole along the longitudinal axis. Also, the elongated threaded rod extends along the longitudinal axis of the bobber assembly. Generally, the various elements that form the bobber release device surround the longitudinal axis, such as the elements described above as well as the spring, housing and fastener.

The housing 12 includes a first open end and a second open end. The interior side 12a of the housing generally comprises a first compartment 12d including the first open end, and a second compartment 12e including the second open end, with a partition 12c or other barrier separating the compartments. The interior of the housing may include additional compartments without departing from the scope of the invention. In an exemplary embodiment, the interior partition 12c is formed by a protrusion of the housing's interior wall extending inward from the wall to form a center opening that is aligned with the center hole and the central hole along the longitudinal axis. In another example, the barrier is formed utilizing a washer or other suitable element. The barrier may also be formed by two or more posts, pegs, or other elements extending inward from the interior wall, so long as a center opening is maintained between the first and second compartments. The housing's exterior side 12b is attached to the mounting bracket 26 which is connected to the fishing rod as described above.

As noted above, the bobber release device also includes a bobber that is deployed when the bobber release device is exposed to water. In order to enable a person to locate the submerged fishing rod, the bobber includes a buoy or some otherwise buoyant material that brings the bobber to the top of the water once deployed. In one exemplary embodiment, the bobber includes a retention element that, when used in conjunction with other aspects of the device, retains the bobber in the housing prior to being jettisoned. In another embodiment, the bobber includes a tube extending through the center of the bobber for accepting a screw. The center tube may be formed through the buoy or the buoyant material itself, or the center tube may be formed from a different material or structure, such as a hard plastic, with the buoy or buoyant material secured around the tube. Once the screw passes into the center tube and through the bobber, a washer and nut secure the screw, allowing the screw to act as a retention element. Those of ordinary skill in the art will recognize that other items may be used as a retention element, channel and/or tube without departing from the scope of this invention. Regardless of its form, the retention element extends a sufficient distance from the first compartment of the housing, through the center opening, and into the second compartment (or vice versa) for the retention element to be engaged, as described below with respect to the bobbin assembly.

In one embodiment, the washer and screw fit into a recessed cavity 14d at or near the end of the center tube. The cavity may optionally be formed to hold the washer and nut stationary, such that once the threaded end of the screw is engaged, the washer and nut are held in place while the screw turns. In other words, the cavity permits "self-tightening" operation to secure the retention element.

As indicated above, in the embodiment shown in FIGS. 1 and 2, the bobber release device 100 preferably includes a spring 24 positioned between the bobber and the partition in the first compartment. Although the spring is illustrated as a helical spring, any compressible material that acts in a similar manner may be used without departing from the scope of the present invention. The recovery line 16 is attached between the bobber and the housing and includes, but is not limited to, monofilament line, string, wire, or cable. In one embodiment, the recovery line attaches to the bobber assembly 16a at one end, passes through the interior of the spring along its longitudinal axis, and attaches to the housing or the rod at the other end 16b. According to an aspect of the device, the bobber includes a retrieval line retaining element disposed on or around the bobber, the retention element, or both. The retrieval line is wound around the spool 14b.

The second compartment includes the bobbin assembly 18 positioned therein to engage the retention device and hold the bobber against the compressed spring. In a preferred embodiment of the device, the bobbin assembly includes a center section 18a which preferably has longitudinal fingers 18a' radially spaced around the longitudinal axis and positioned parallel to an outside wall 18d as particularly shown in FIG. 1B. Each one of the fingers preferably has a base section 18a'' that extends radially outward and connects to the outer wall. A bobbin dissolvable tablet, such as a salt tablet or pill, with a center hole is positioned between the outer wall 18d and the longitudinal fingers to retain the fingers in their longitudinal position. In the preferred embodiments, the bobbin assembly is generally cylindrical in shape and the solid bobbin tablet 18c' is annular in shape with an inner annular surface 48a and an outer annular surface 48b between the longitudinal fingers 18a' and the outer wall 18d, respectively. In the embodiments shown in the drawings, the bobbin assembly is a HALKEY-ROBERTS V80040 Super Bobbin as described by U.S. Pat. No. 6,705,488 which is incorporated by reference herein. It will also be appreciated that the bobbin assembly and dissolvable tablet may be formed in other shapes that have a framework with a radially-expandable center hole 18b which transitions from a narrow hole 18b' with a smaller diameter than the flared head of the screw when the dissolvable tablet its solidified form to an expanded hole 18b" with a diameter that expands to at least the diameter of the flared head when the dissolvable tablet transitions to a dissolved state.

While the dissolvable tablet remains in its solid form, the longitudinal fingers are retained in their parallel position, and the tips of the fingers form a seat for engaging the retention element, e.g., the grommet threaded onto the screw, the head of the screw, etc., and holding the bobber in place against the force of the spring. The bobbin assembly's seat "redirects" the axial force 38 of the spring into a expansive force 36 pushing radially outward against the fingers and the dissolvable tablet. From the perspective of the dissolvable tablet 18c, the outward force is compressive, pushing the tablet against the outer wall. By holding the salt pill or other dissolvable tablet within the bobbin housing, there is no concentration of the spring force through a particular region of the tablet and the primary loading between the spring force through the bobbin can be made through materials with similar structural properties. The bobbin housing distributes the force radially around the entire circumference of the tablet rather than concentrating the spring force directly through only one section of the tablet. Accordingly, it will be appreciated that other bobbin assemblies could also be used, such as the design described by U.S. Pat. No. 4,260,075 which is also incorporated by reference herein.

Figure 2B:
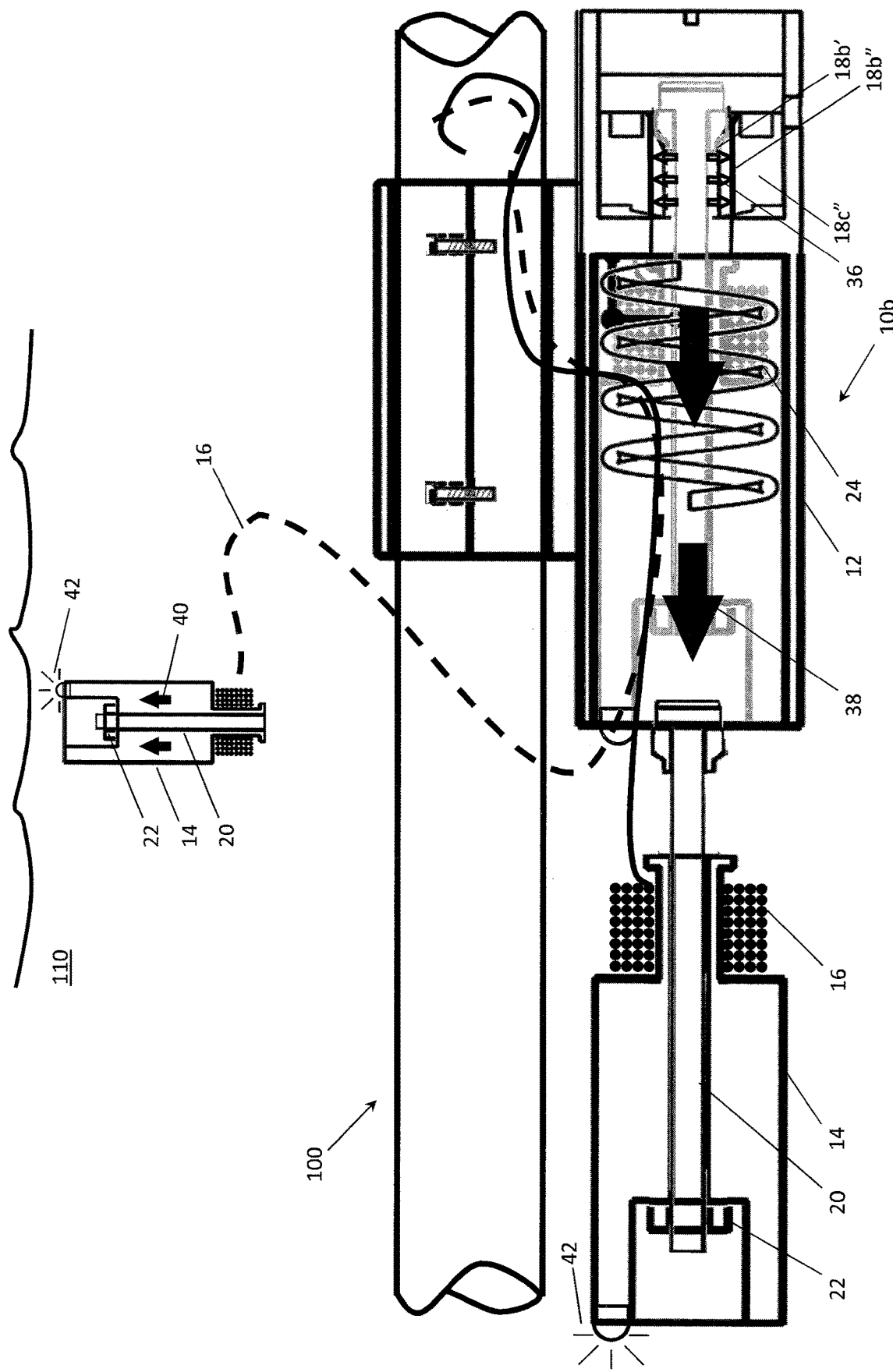

As shown in FIG. 2A, the bobber release device is placed into a ready configuration 10a, i.e., an "armed-and-ready" state, by winding the retrieval line around the spool and inserting the bobber into the first compartment, with the spring positioned between the bobber and the barrier, putting the spring into a compressed state. For the purposes of this example and as illustrated in FIGS. 1 and 2, a screw with a grommet threaded thereon acts as the retention element. When placing the bobber release device into its ready state, the threaded end of the screw passes through the center hole of the bobbin, through the center opening of the barrier, through the bobber via the center tube, where a washer and screw secure the screw. An end cap 32 is then disposed around the second open end of the housing, enclosing the second compartment. This configuration of elements is referred to as the "ready state" of the bobber release device. In FIG. 1, the end cap 32 has one or more orifices 34a with the valve sealing the orifice in the closed position. In FIGS. 2A and 2B, the cap 32 is solid and water can enter into the interior of the housing through orifices 34b in the housing wall. It will be appreciated that one or more valves could be used in conjunction with these orifices in the housing wall according to the general teaching of the present invention.

In the event that the device is submerged to a sufficient depth, water enters past the valve assembly 50 to the second compartment and the bobbin tablet is exposed to the water, at which point the tablet begins to dissolve or otherwise disintegrate as designed. In this dissolved/disintegrated state, the tablet is unable to prevent the fingers from flexing or moving. The longitudinal fingers of the bobbin device then begin to flex and/or move radially outward under the axial force of the spring acting on the retention element, thereby expanding 36 the bobbin assembly's center section 18a. The bobber then moves from its first, interior position to a second position outside the housing, e.g., the bobber is then ejected from the second compartment to the exterior of the housing by the spring. The deployed configuration 10b of the device is illustrated in FIG. 2B. Once the bobber release device enters its deployed state, the bobber separates from the housing and the recovery line unwinds from the spool as the bobber floats upward 40 due to its buoyancy. Once the bobber reaches the surface of the water, a person searching for the fishing rod retrieves the fishing rod by locating the bobber and pulling the rod to the surface. Advantageously, the person may then wind the retrieval line back onto the spool and quickly reassemble the bobber release device back into its ready state for continued operation, due to the combination of elements described above.

The described configuration of the housing, bobber assembly, and bobbin assembly advantageously preserve the physical integrity of the dissolvable tablets by redirecting the "shearing" forces of the retention element radially outward against the fingers of the bobbin assembly. And by way of minimizing the number of moving parts, the bobber release device is quickly resettable and reusable, unlike those devices described in the prior art above. Also, to help in visually locating the deployed bobber, particularly at night, the bobber may include a water-resistant, solid state light element 14e, such as an LED that is connected to a battery 14f which is activated 42 when the bobber is deployed. There are a number of ways to activate the circuit between the LED and battery. For example, there may be a nonconductive sheet 14g or film between the leads connecting the LED to the battery, and when the film is removed, the circuit between the LED and the battery is closed. One end of the film may be connected to the housing so that it is pulled away when the bobber is deployed, thereby activating the circuit. Alternatively, the film may be water soluble so that it dissolves when the device is submerged, thereby activating the circuit. It is also possible for an annular ring or catch within the housing to engage a switch mechanism on the bobber as it is ejected from the housing to activate the circuit. The battery can be a replaceable item or the entire light assembly may be replaceable after the device is submerged and the bobber assembly is deployed.

The retrieval line 16 passes through and extends outside the housing. In this embodiment, the person operating the fishing rod with the selects where to attach the second end of the retrieval line. For example, the person may attach the second end to the housing or to the rod itself. It is possible to connect the second end of the retrieval line to the housing and with an end segment that is long enough to also connect to the rod.

The interior face of the end cap 32 may include a screwdriver which allows the retention element to be engaged and the bobber release device to be quickly loaded. As noted above, the bobber assembly may optionally include a recessed cavity that permits "self-tightening". This combination of elements advantageously permits the person to quickly reset and reuse the bobber release device without the need for extra tools.

An alternative embodiment of the bobber release device 10 according to the present invention is shown in FIGS. 3-5 and illustrates a different arrangement of the parts in the water-activated bobber release device 10. In this embodiment, the device 10 fits in the butt end 102 of the rod 100 and the longitudinal axis 30 of the bobber assembly 14 and the device is substantially aligned with the fishing rod's primary axis 46 extending from the butt end 102 to the tip end 104. The alternative arrangement of parts could also be used for a bobber release device that is offset from the tool, such as the device described above and illustrated in FIGS. 1-2 in which the longitudinal axis of the device is substantially parallel to the rod's primary axis, although it is preferably incorporated into the base end of a rod or with a handle or other extension to a grip in any other tool. In this arrangement, a cylindrical sleeve 28 extends over the base end of the rod and is preferably connected to the rod by glue or an epoxy. Of course, it will be appreciated that the housing 12 could be formed as a part of the tool with the other parts of the bobber release device fitting within the housing, or the housing can be a separate construction which is attached to the tool.

The cap of the sleeve has a threaded central hole 22 or has a threaded nut fixed within the center of the sleeve. Generally, the threaded hole or nut is a threaded fastener for the screw. The bobber and spool assembly 14 with the line 16 is held to the sleeve by a screw 20 extending through the bobbin assembly 18. The salt bobbin preferably fits within a recess 14d in the bobber 14, and the screw extends through the central opening of the salt bobbin and screws into the threaded cap of the sleeve. The screw has a flared head and/or grommet which engages the center portion of the salt bobbin, and the flared head is wider than the central opening of the salt bobbin when the salt bobbin is solidified. The screw pulls the bobber and spool assembly toward the sleeve and compresses a spring that fits between the side of the sleeve that is opposite the threaded central hole and the side of the bobber and spool assembly that is opposite the recess. The line extends from the spool and is attached to the rod or the sleeve, and a housing 12 preferably covers the sleeve, spring and spool with the line and abuts the bobber.

Figure 4A:
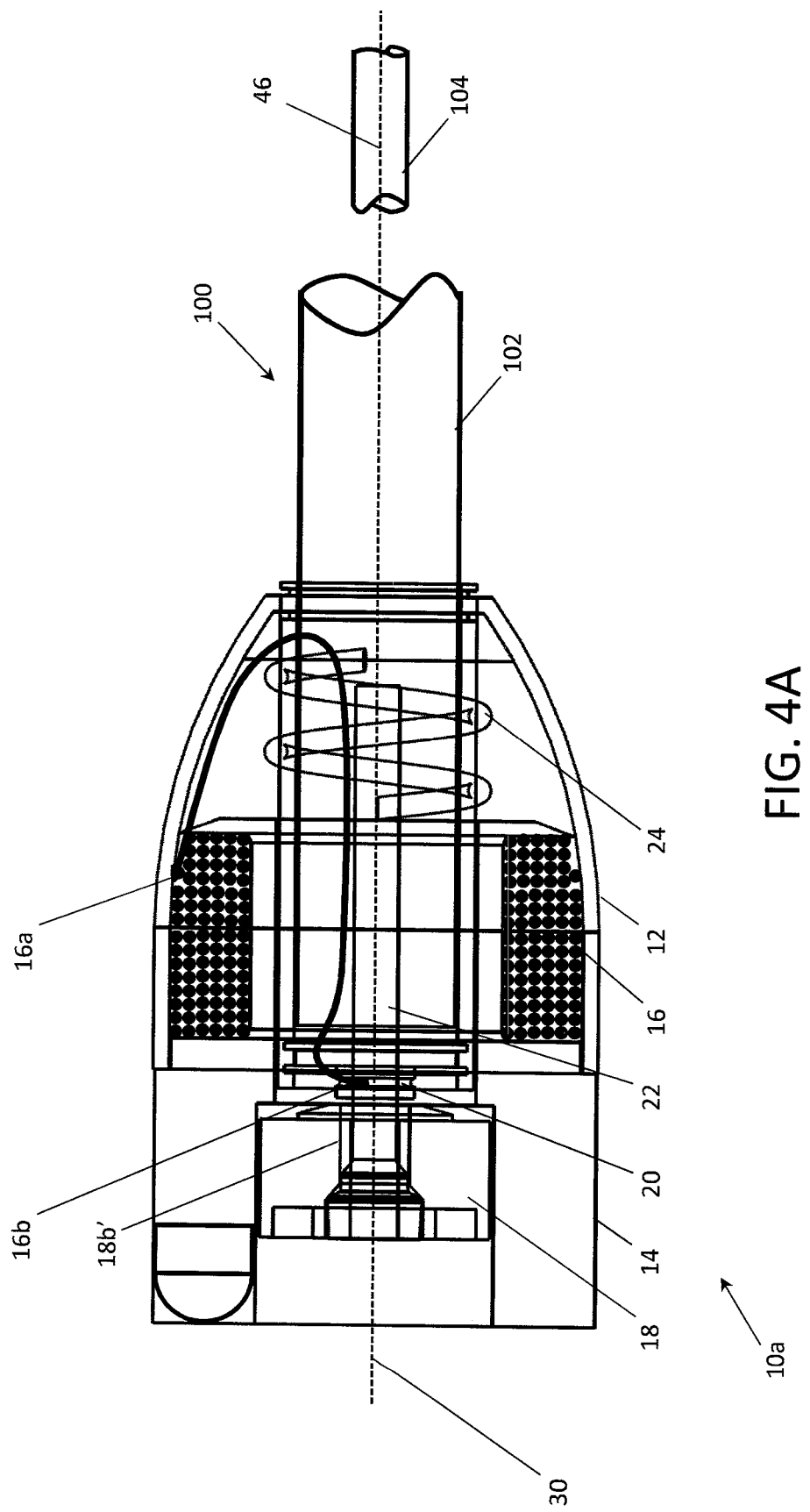
FIGS. 4A and 4B respectively show a bobber release device similar to the device shown in FIG. 3 in a ready configuration and in a deployed configuration.
Figure 4B:
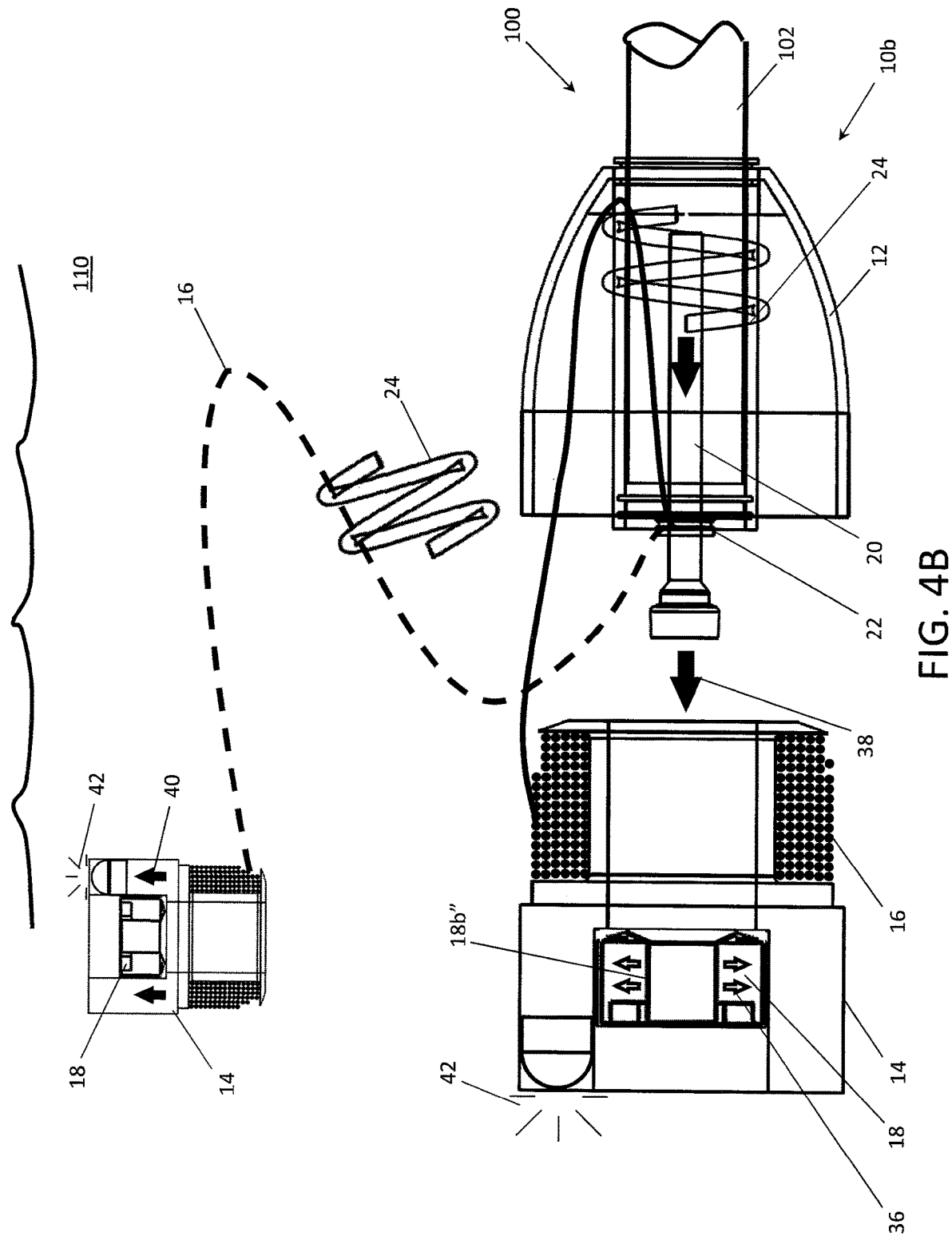

The embodiment shown in FIG. 3 includes a plug-type cap 32 that has one or more orifices 34a, and the valve covers and seals the orifice in the closed position. In this embodiment, the cap 32 is preferably press fit into the bobber's recessed cavity 14d. The cap could alternatively be attached to the bobber, either on its exterior side or in the cavity, by an adhesive layer 58. Additionally, if the housing in this embodiment continued around the exterior side of the bobber, the cap could be press fit into the cavity or could wrap over the outer surface of the housing with a friction fit connection. In this latter arrangement (not shown), the spring 24 would need sufficient force to overcome the friction fit connection to push the cap off of the housing while it pushes the bobber assembly out of the housing. The embodiment shown in FIGS. 4A and 4B illustrate the device in operation when the bobber is released after the valve has been opened.

If the rod, firearm or other tool is dropped into water, the salt tablet in the salt bobbin dissolves within the bobbin framework. As the salt dissolves, the bobbin framework loses the structural foundation that the solidified salt tablet had provided, and the potential energy in the compressed spring ultimately overcomes the weakening foundation and pushes the spool assembly and the salt bobbin past the flared head of the screw, freeing the bobber assembly from its connection to the housing. Similar to the embodiment described above with reference to FIGS. 1-2, the potential energy of the compression spring is countered by the flared head of the screw engaged with the bobbin framework around the central hole. Accordingly, the potential energy of the screw is transferred through the bobbin framework to the salt tablet and is distributed radially through the entire circumference of the salt tablet. As the salt tablet dissolves within the salt bobbin, its support to the bobbin framework weakens and ultimately spreads radially outward as the spring forces the bobbin past the flared head of the screw and frees the spool assembly with the line.

Figure 5A:
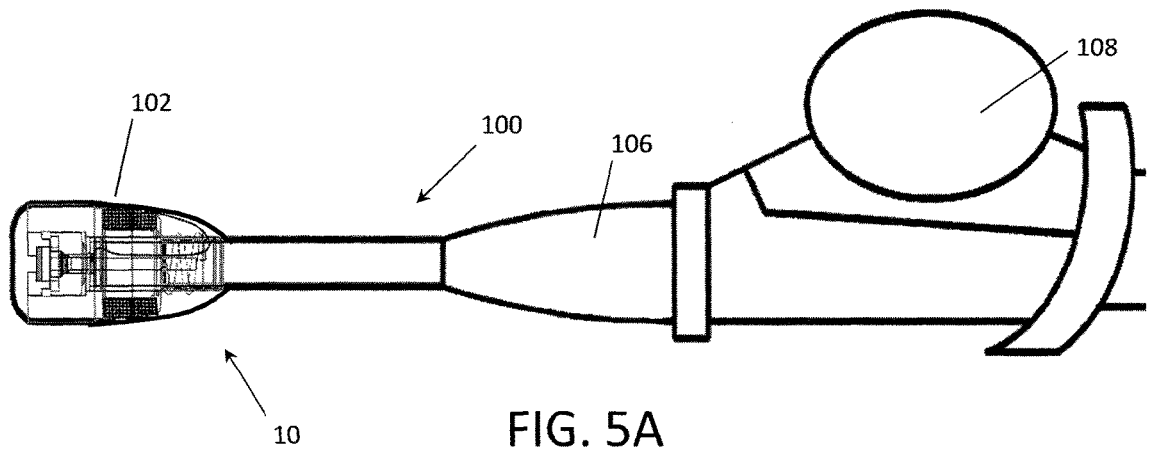
FIGS. 5A-5C show the bobber release device of FIG. 3 incorporated into rod handles with alternative valve mechanisms.
Figure 5B:
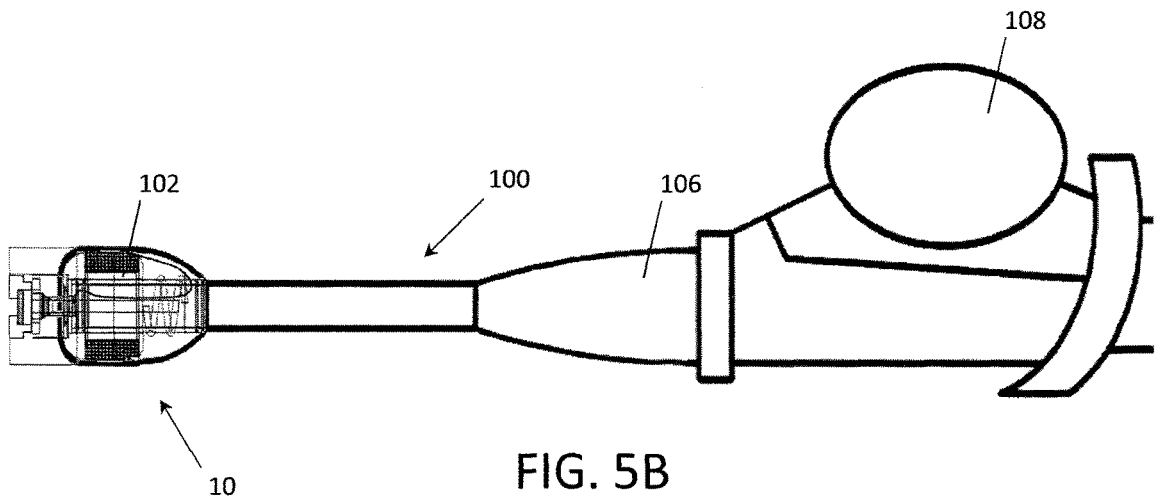
Figure 5C:
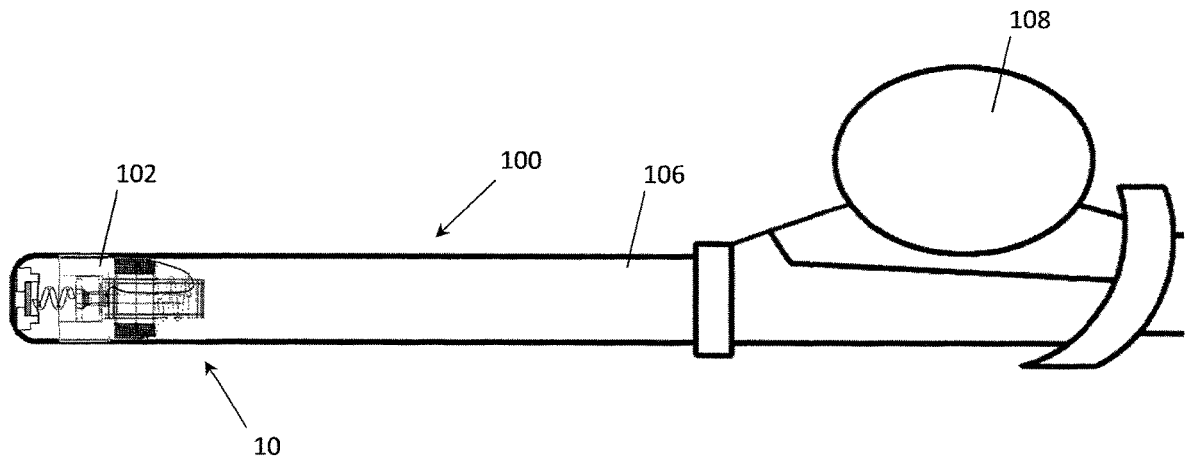

It will be appreciated that the sleeve can be made in different inner diameters to fit over different sized rods and other grips. Similarly, the housing that extends from the sleeve over the spool assembly and mates with the bobber can have different contours and shapes to correspond with various rod handles and other grips. For example, the housing may be squared off to fit up against cork handled rods and made slimmer to mimic longer skinnier rod handles. Generally, the housing provides a shield for the line and the spring which protects them from weather and the elements. It will also be appreciated that the water-activated bobber release device can be attached the end of a rod or other grip using the sleeve as shown in FIGS. 3, 4 and 5A or may incorporated directly into the rod as shown in FIGS. 5B and 5C.

As generally described above, the water-activated bobber release device 10 includes a cap, plug or other closure 32 that covers the end of the device which contains the bobbin assembly with the dissolvable tablet. The cap has one or more apertures, and the valve structure is situated in the interior space of the cap between the aperture and the bobbin assembly and covers the aperture. The valve is activated relative to particular water depths and the water pressure associated with those water depths. Accordingly, the depth dependent valve can be a porous non-mechanical valve, a spring-loaded valve, a stop valve, or any other valve that covers the aperture and is opened by water pressure. When the housing is submerged to a particular water depth where the pressure is cable of opening the valve, the valve is opened by the force of the water either passing through pores in the disc material or moving the disc further into the housing away from the apertures. Once the valve is opened, water enters the interior space of the cap through the aperture and flows to the bobbin assembly where it dissolves the tablet as explained above, thereby releasing the bobber from the housing. According to the embodiments disclosed above, the cap can be secured to the housing using a threaded connection, a press fit connection, or a friction fit connection, or the cap can be secured within the recessed cavity of the bobber by a press fit connection or can be attached to the bobber by an adhesive layer 58.

Figure 6A:
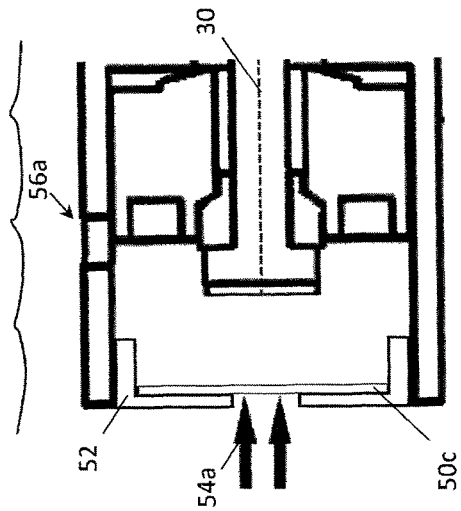
FIGS. 6A and 6B respectively show cross-sectional views of a cap with a porous non-mechanical valve in a closed configuration and an opened arrangement.
Figure 6B:
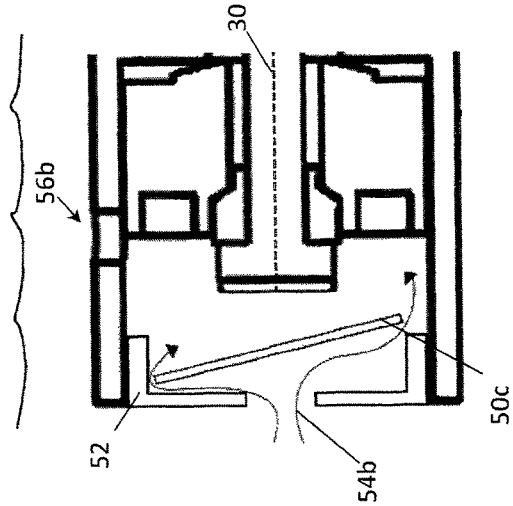

As shown in FIGS. 6A and 6B, the disc is formed from a porous plastic material and operates as a porous non-mechanical valve 50a. In this embodiment, the disc 50a' can be attached to the inside of the cap by an adhesive layer 58 so that the disc completely covers the orifice in the cap and is secured to the cap. The porous plastic has an open-cell structure, and the size of the pores, the shape and tortuous path of the interstices, and the thickness of the material have an impact on the extent to which water is blocked by the disc structure. These factors can be varied to vary the water intrusion pressure 54b at which the water will pass through the porous plastic material. When the housing is submerged in water and reaches the depth corresponding to the water intrusion pressure 54b, water passes through the pores into the interior space of the cap to the bobbin assembly. In operation, the water intrusion pressure for the porous plastic can be set at a relatively shallow depth, approximately four feet of fresh water and between eight to ten feet of sea water, and will still provide good water resistance for ordinary operations. Accordingly, if the housing is splashed with water or is only slightly submerged or inadvertently dunked under the surface of the water, for example when an angler is landing a fish, the water pressure is insufficient to activate the valve and the bobbin is not prematurely deployed.

Figure 7A:
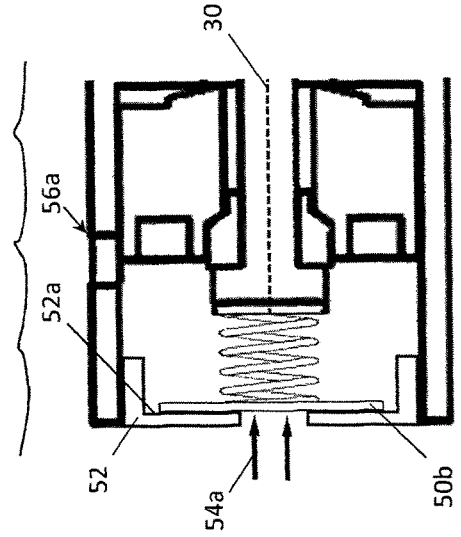
FIGS. 7A and 7B respectively show cross-sectional views of a cap with a spring-loaded valve in a closed position and an opened position.
Figure 7B:
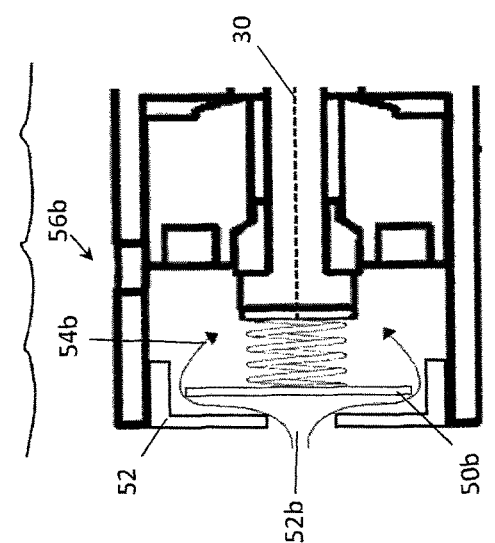

As shown in FIGS. 7A and 7B, a spring 50b" biases the disc against the aperture 52b in the closed position 56a of the spring-loaded valve 50b. The valve spring is compressed between the screw at one end and the disc at the other end. When the housing 12 is submerged below the surface of the water to a particular depth, the water pressure 54b forces the spring-loaded valve 50b into its open position 56b by pushing against the disc through the aperture and forcing the disc into the housing against the force of the valve spring. Again, when the valve is pushed into its open position, the water enters into the interior space of the cap to the bobbin assembly.

Figure 8A:
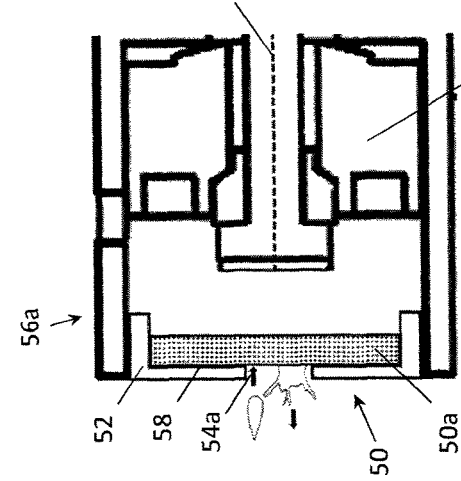
FIGS. 8A and 8B respectively show cross-sectional views of a cap with a stop valve in a closed position and an open position.
Figure 8B:
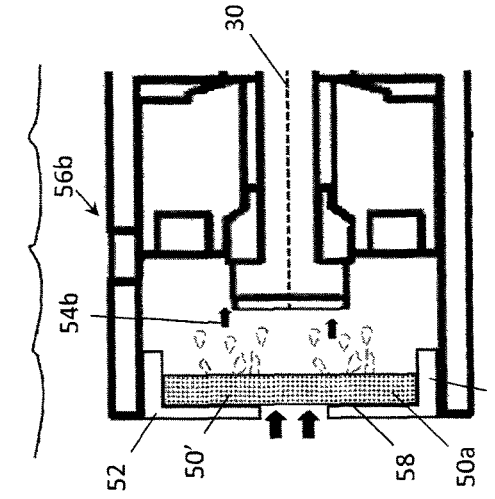
Figure 9A:
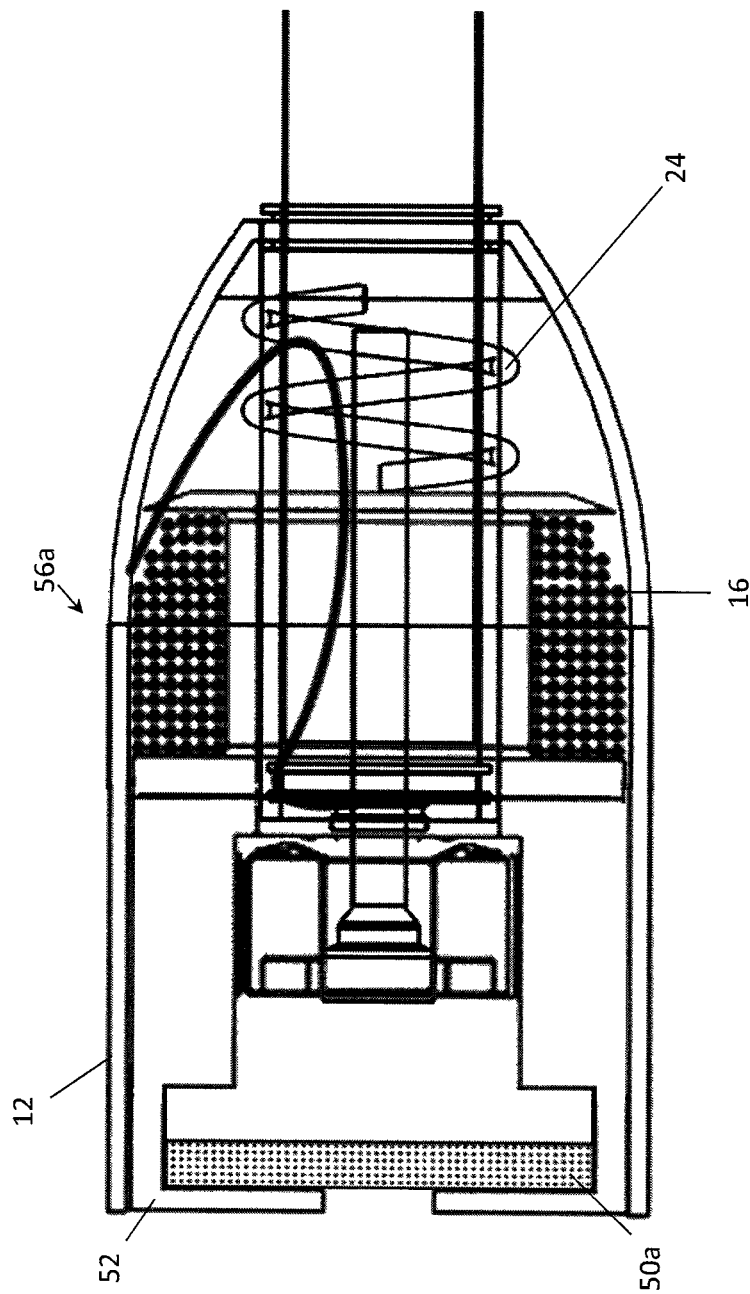
Figure 10A:
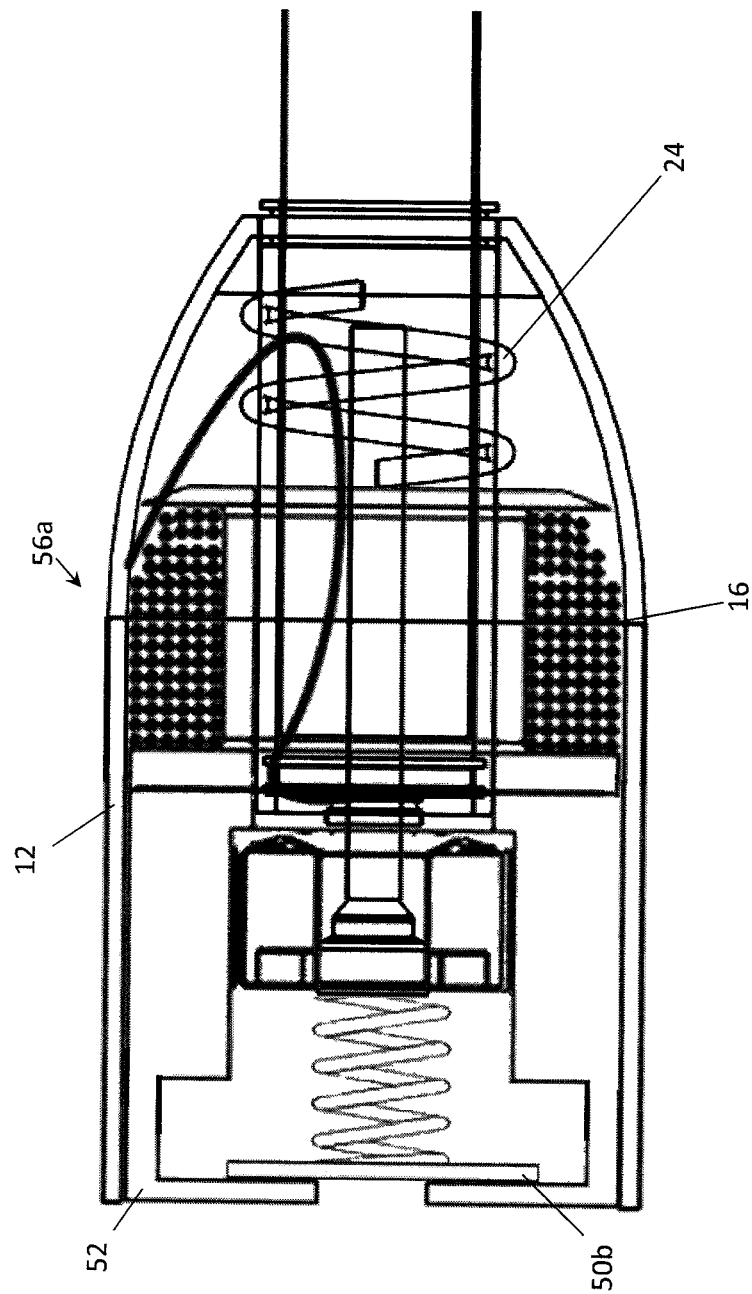
FIGS. 10A and 10B respectively show a bobber release device similar to the device having the spring valve system in a ready configuration and in a deployed configuration.
Figure 10B:
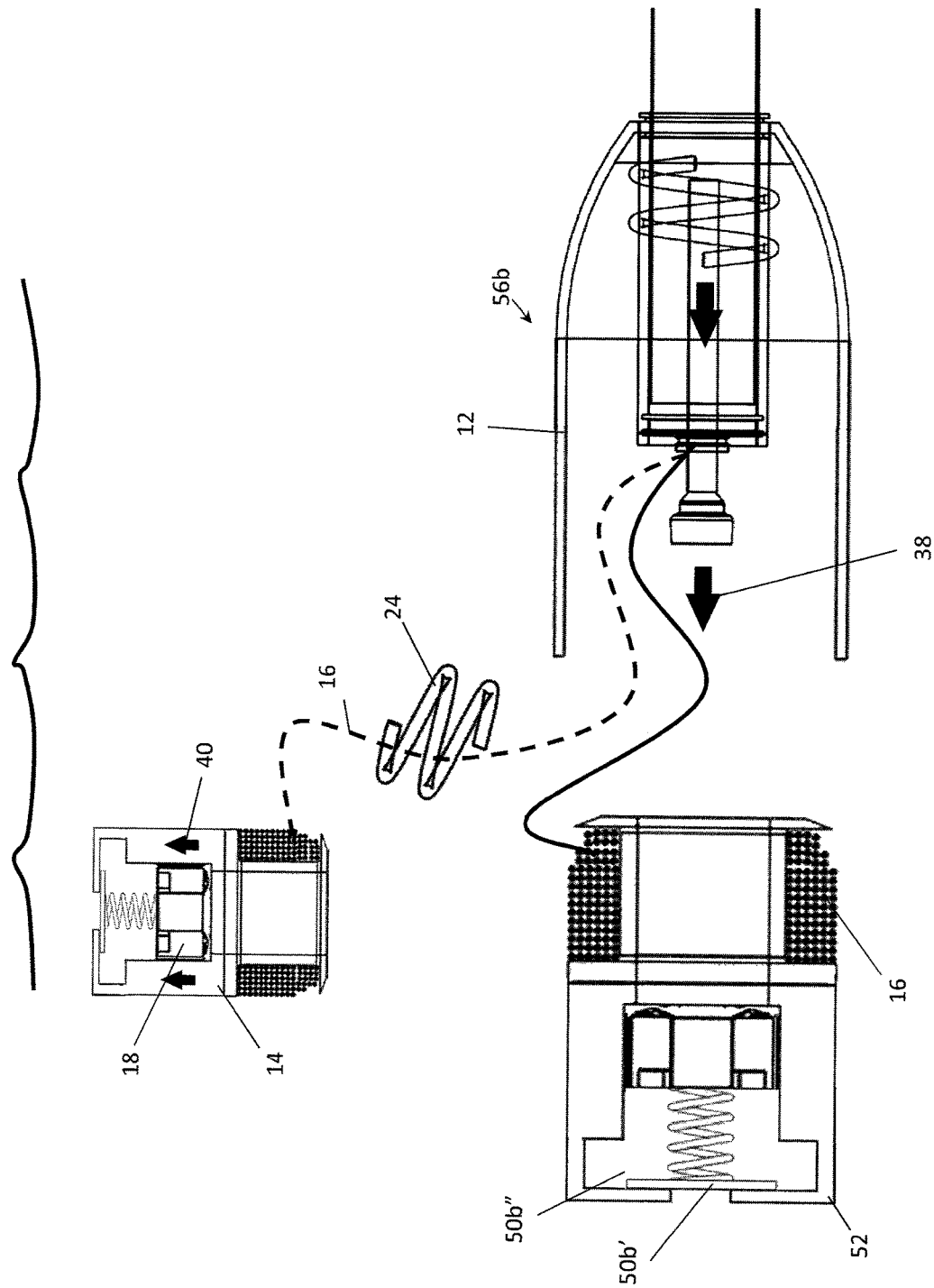

As shown in FIGS. 8A and 8B, the disc can be formed from a nonporous material that operates as a stop valve 50c. The disc 50c' can be friction fit within the cap to close the valve by covering the aperture 52b and sealing the housing 12. When the housing is submerged beneath the surface of the water, the water pressure at a shallow depth the water pressure 54a is insufficient to push the valve from its seating. At a sufficient pressure 54, the water dislodges the disc from its friction fit seat to move into the housing and opening the valve. The stop valve is similar to the spring-loaded valve except that it is the friction fit that keeps the disc pressed against the aperture in the closed position 56a and the water overcomes the friction force rather than a spring force to move the disc and open the valve.

According to each embodiment of the present invention, the depth-dependent valve activates and opens to allow the entrance of water into the housing and onto the bobbin assembly based on the force applied by the surrounding water pressure. Water pressure varies relative to the depth of the water so the activation depth similarly varies, and the valve can be set so that it will not open unless the water pressure corresponds to a depth that would avoid water entering the housing under ordinary circumstances when the device has not fallen into a body of water. Accordingly, the valve will not open even when the device is left out in rain or is inadvertently dipped at the surface of the water or is splashed by water in ordinary operation or is wetted in some other similar manner where short exposure to water does not have the sufficient force to open the valve.

It should be noted that, while this application describes water as the activating agent for the release device, any liquid capable of sufficiently dissolving or weakening the bobbin assembly/salt bobbin is within the scope of this invention. Furthermore, one of ordinary skill in the art would recognize that, while the above-described embodiments relate to a device, one or more systems or one or more methods describing the elements, functions, and operations remain within the scope of this invention. When the bobber assembly is jettisoned or otherwise ejected from the housing, the spring may also be ejected as shown in FIG. 4B. Alternatively, as shown in FIG. 2B, the spring may be connected to the housing at the end facing the interior side of the housing, opposite from the end facing bobber assembly, so that when the bobber assembly is jettisoned from the housing, the spring is retained within the housing. In either arrangement, the line may be threaded through the spring so that in the event that the spring does become dislodged from the housing upon deployment of the bobber assembly, the spring is held on the line as the rod is retrieved.

The present invention is particularly described as it may be mounted, attached or otherwise formed as a part of a fishing rod. As indicated above, the bobber release device 10 may be mounted or attached to any item of value that might be used in or around water, such as a tackle box, rifle, shotgun, or any other tool. When connected to a fishing rod, the device may also include a line cutter 44.

The embodiments explain the principles of the invention and its practical application. Modifications could be made to the exemplary embodiments described above with reference to the corresponding illustrations without departing from the scope of the invention. Accordingly, all matter contained in the foregoing description and shown in the accompanying drawings shall be interpreted as illustrative rather than limiting. For example, although the bobbin assemblies shown in the drawings and described above all include a framework around the tablet, it is possible to use a dissolvable tablet with a center hole without any framework around it. The assembly may have center fingers or a center sheath to engage with the screw's flared head, or it may all be dissolvable. Thus, the breadth and scope of the present invention should not be limited by any of the above-described exemplary embodiments, but should be defined only in accordance with the following claims appended hereto and their equivalents.

What is claimed is:

1. A water-activated bobber release device for a tool, comprising:
   a housing connected to the tool;
   a bobber assembly comprising a bobber, a spool fixedly attached to the bobber, and a central hole surrounding a longitudinal axis of the bobber assembly, wherein the spool fits within the housing in a ready configuration and is jettisoned away from the housing in a deployed configuration, wherein the bobber is at one end of the bobber assembly and the spool is at an opposite end of the bobber assembly and wherein the central hole extends through the bobber and the spool along the longitudinal axis;
   a line wrapped around the spool and connected to the bobber assembly at a first end and connected to at least one of the housing and the tool at a second end;
   a bobbin assembly comprised of a center section surrounding a center hole and a dissolvable tablet circumferentially surrounding the center section, wherein the center hole is axially aligned with the central hole of the bobber assembly along the longitudinal axis;
   a screw extending through the center hole and the central hole;
   a spring compressed by the bobbin assembly when the dissolvable tablet is in a solidified form;
   a cap connected to at least one of the housing and the bobber assembly, wherein the cap is comprised of an exterior side, an interior side, and an aperture extending through the cap from the exterior side to the interior side; and
   a valve situated between the interior side of the cap and the bobbin assembly, wherein the valve covers and seals the aperture in a closed arrangement.

2. The bobber release device of claim 1, wherein the screw comprises a flared head and an elongated threaded rod extending along the longitudinal axis of the bobber assembly, wherein the flared head engages the center section at a first side of the bobber assembly, and wherein the flared head is larger than the center hole when the dissolvable tablet is in the solidified form.

3. The bobber release device of claim 2 further comprising a threaded fastener axially aligned with the central hole of the bobber assembly and the center hole of the bobbin assembly, wherein the threaded rod engages the threaded fastener, wherein the spring is compressed between the bobbin assembly and the threaded fastener when the dissolvable tablet is in the solidified form.

4. The bobber release device of claim 1, wherein the valve further comprises a disc abutting the interior side of the cap and covering the aperture in the closed arrangement.

5. The bobber release device of claim 4, further comprising an adhesive attaching the disc to the interior side of the cap, wherein the disc is comprised of a porous plastic with a closed arrangement at water pressures less than a water intrusion pressure and an open arrangement at water pressures exceeding the water intrusion pressure.

6. The bobber release device of claim 4, further comprising a valve spring connected to the disc at its distal end and the bobbin assembly at its proximal end, wherein the valve spring has an extended configuration pushing the disc against the aperture in the closed arrangement, and wherein the valve spring has a compressed configuration with the disc pushed away from interior side and the aperture in an opened configuration.

7. The bobber release device of claim 4, wherein the interior side of the cap has a wall surrounding the aperture and a seat, and wherein the disc is fitted within the seat in the closed arrangement and is dislodged from the seat in an opened configuration.

8. A water-depth dependent bobber release device for a tool, comprising:
  a housing;
  a means for connecting the housing to the tool;
  a bobber assembly comprising a bobber, a spool fixedly attached to the bobber and a central hole surrounding a longitudinal axis of the bobber assembly, wherein the bobber assembly fits within the housing in a ready configuration and is jettisoned away from the housing in a deployed configuration, wherein the bobber is at one end of the bobber assembly and the spool is at an opposite end of the bobber assembly, and wherein the central hole extends through the bobber and the spool along the longitudinal axis;
  a line wrapped around the spool and connected to the bobber assembly at a first end and connected to at least one of the housing and the tool at a second end;
  a bobbin assembly comprised of a center hole, a center section comprising a plurality of longitudinally extending fingers spaced radially around the center hole, a dissolvable tablet circumferentially surrounding the fingers, and an outer wall circumferentially surrounding the dissolvable tablet, wherein a base section of each of the fingers extends radially outward and connects to the outer wall, and wherein the center hole is axially aligned with the central hole of the bobber assembly along the longitudinal axis;
  a screw extending through the center hole and the central hole;
  a threaded fastener axially aligned with the central hole of the bobber assembly and the center hole of the bobbin assembly;
  a spring compressed within the housing by the screw and the threaded fastener when the dissolvable tablet is in a solidified form, wherein a dissolved state of the dissolvable tablet allows the spring to force the bobber assembly into the deployed configuration;
  a cap connected to at least one of the housing and the bobber assembly, wherein the cap is comprised of an exterior side, an interior side, and an aperture extending through the cap from the exterior side to the interior side; and
  a valve situated between the interior side of the cap and the bobbin assembly, wherein the valve covers and seals the aperture in a closed arrangement.

9. The bobber release device of claim 8, wherein the screw comprises a flared head and an elongated threaded rod extending along the longitudinal axis of the bobber assembly, wherein the flared head engages the center section at a first side of the bobbin assembly, and wherein the flared head is larger than the center hole when the dissolvable tablet is in the solidified form.

10. The bobber release device of claim 9 wherein the spring forces the flared head to move the fingers outward towards the outer wall and expand the center hole when the dissolvable tablet transitions from the solidified form to the dissolved state, and wherein the spring forces a relative movement of the flared head through the center section from the first side and out of a second side when the dissolvable tablet transitions from the solidified form to the dissolved state.

11. The bobber release device of claim 8, wherein the valve further comprises a disc abutting the interior side of the cap and covering the aperture in the closed arrangement.

12. The bobber release device of claim 11, further comprising an adhesive attaching the disc to the interior side of the cap, wherein the disc is comprised of a porous plastic with a closed arrangement at water pressures less than a water intrusion pressure and an open arrangement at water pressures exceeding the water intrusion pressure, and wherein the water pressure is greater than the water intrusion pressure at a water depth greater than three feet.

13. The bobber release device of claim 11, further comprising a valve spring connected to the disc at its distal end and the bobbin assembly at its proximal end, wherein the valve spring has an extended configuration pushing the disc against the aperture in the closed arrangement, and wherein the valve spring has a compressed configuration with the disc pushed away from interior side and the aperture in an opened configuration.

14. The bobber release device of claim 8, wherein the interior side of the cap has a wall surrounding the aperture and a seat, and wherein the disc is fitted within the seat in the closed arrangement and is dislodged from the seat in an opened configuration.

15. A water-activated bobber release device for a tool, comprising:
  a housing connected to the tool;
  a bobber assembly attached to at least one of the housing and the tool by an attachment mechanism, wherein the bobber assembly is comprised of a bobber, a spool fixedly attached to the bobber, and a central hole surrounding a longitudinal axis of the bobber assembly, wherein the spool fits within the housing in a ready configuration and is jettisoned away from the housing in a deployed configuration, wherein the bobber is at one end of the bobber assembly and the spool is at an opposite end of the bobber assembly and wherein the central hole extends through the bobber and the spool along the longitudinal axis;
  a bobbin assembly comprised of a center section surrounding a center hole and a dissolvable tablet circumferentially surrounding the center section, wherein the center hole is axially aligned with the central hole of the bobber assembly along the longitudinal axis;
  a screw extending through the center hole and the central hole;
  a spring compressed by the bobbin assembly when the dissolvable tablet is in a solidified form;

a cap connected to at least one of the housing and the bobber assembly, wherein the cap is comprised of an exterior side, an interior side, and an aperture extending through the cap from the exterior side to the interior side; and a disc abutted to the interior side of the cap, wherein the disc covers and seals the aperture in a closed arrangement, wherein an adhesive attaches the disc to the cap, wherein the disc is comprised of a porous plastic with a closed arrangement at water pressures less than a water intrusion pressure, and an open arrangement at water pressures exceeding the water intrusion pressure.

16. The bobber release device of claim 15 wherein the screw comprises a flared head and an elongated threaded rod extending along the longitudinal axis of the bobber assembly, wherein the flared head engages the center section at a first side of the bobbin assembly, and wherein the flared head is larger than the center hole when the dissolvable tablet is in the solidified form.

17. The bobber release device of claim 16 further comprising a threaded fastener axially aligned with the central hole of the bobber assembly and the center hole of the bobbin assembly, wherein the threaded rod engages the threaded fastener, wherein the spring is compressed between the bobbin assembly and the threaded fastener when the dissolvable tablet is in the solidified form.

18. The bobber release device of claim 16, wherein the center section further comprises a plurality of longitudinally extending fingers and an outer wall, wherein the fingers are spaced radially around the center hole, wherein the dissolvable tablet circumferentially surrounds the fingers, wherein the outer wall circumferentially surrounds the dissolvable tablet, wherein a base section of each of the fingers extends radially outward and connects to the outer wall, wherein the spring forces the flared head to move the fingers outward towards the outer wall and expand the center hole when the dissolvable tablet transitions from the solidified form to the dissolved state, and wherein the spring forces a relative movement of the flared head through the center section from the first side and out of a second side when the dissolvable tablet transitions from the solidified form to the dissolved state.

19. The bobber release device of claim 15, wherein the interior side of the cap has a wall surrounding the aperture and a seat, and wherein the disc is fitted within the seat in the closed arrangement and is dislodged from the seat in an opened configuration.

20. The bobber release device of claim 15, wherein the attachment mechanism is a line, wherein the line is wrapped around the spool and connected to the bobber assembly at a first end and connected to at least one of the housing and the tool at a second end.

* * * * *